US010685290B2

(12) United States Patent
Hack et al.

(10) Patent No.: US 10,685,290 B2
(45) Date of Patent: Jun. 16, 2020

(54) PARAMETER MANAGEMENT THROUGH RDMA ATOMIC OPERATIONS

(71) Applicant: International Business Machines Corporation, Armonk, NY (US)

(72) Inventors: Michel H. T. Hack, Cortlandt Manor, NY (US); Yufei Ren, Somers, NY (US); Yandong Wang, Elmsford, NY (US); Li Zhang, Yorktown Heights, NY (US); Wei Zhang, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 14/982,358

(22) Filed: Dec. 29, 2015

(65) Prior Publication Data

US 2017/0185562 A1 Jun. 29, 2017

(51) Int. Cl.
G06F 15/16 (2006.01)
G06N 20/00 (2019.01)
H04L 12/24 (2006.01)
H04L 29/08 (2006.01)

(52) U.S. Cl.
CPC ......... *G06N 20/00* (2019.01); *H04L 41/0813* (2013.01); *H04L 67/10* (2013.01)

(58) Field of Classification Search
CPC ............ G06F 15/17331; G06N 99/005; H04L 67/1002
USPC ........ 709/212, 217, 204, 224; 707/636, 781; 370/434, 252, 382; 455/446, 522, 552.1, 455/509
See application file for complete search history.

(56) References Cited

U.S. PATENT DOCUMENTS

| 7,450,696 | B2* | 11/2008 | Vishik ........................ 379/88.13 |
| 7,502,826 | B2  | 3/2009  | Barron et al. |
| 8,077,785 | B1* | 12/2011 | Lee ....................... H04B 7/0682 375/260 |
| 8,769,005 | B2* | 7/2014  | Madhani ........... H04L 29/12122 709/204 |
| 9,015,083 | B1  | 4/2015  | Monga et al. |
| 2003/0061296 | A1 | 3/2003 | Craddock et al. |
| 2004/0105396 | A1* | 6/2004 | Eudes ................. H04L 27/3872 370/277 |
| 2005/0288919 | A1* | 12/2005 | Wang .................. G06F 17/2872 704/2 |
| 2005/0289231 | A1* | 12/2005 | Harada .................. G06Q 10/00 709/224 |
| 2007/0153832 | A1* | 7/2007 | Walsh ..................... H04L 69/04 370/474 |

(Continued)

OTHER PUBLICATIONS

A. Devulapalli et al., "Distributed Queue-Based Locking Using Advanced Network Features," International Conference on Parallel Processing (ICPP), Jun. 2005, pp. 408-415.

(Continued)

*Primary Examiner* — Thuong Nguyen
(74) *Attorney, Agent, or Firm* — Anthony Curro; Ryan, Mason & Lewis, LLP

(57) ABSTRACT

One or more parameter changes for one or more parameters are computed at one or more worker nodes. The one or more parameters on a remote server are updated based on the computed one or more parameter changes. The updating is performed via one or more remote direct memory access atomic operations with the remote server.

20 Claims, 10 Drawing Sheets

SERVER SIDE:

VERSION 2  $\begin{bmatrix} 6 & \ldots & 10 \\ 8 & \ldots & 4 \end{bmatrix}$

VERSION 2
W1 GENERATION: 3
W2 GENERATION: 2  $\begin{bmatrix} 6.5 & \ldots & 9.5 \\ 10 & \ldots & 4 \end{bmatrix}$ VERSION 3
W1 GENERATION: 3
W2 GENERATION: 3  $\begin{bmatrix} 8 & \ldots & 10 \\ 12 & \ldots & 4 \end{bmatrix}$ WORKER 1:
ASSUME LOCAL VERSION GENERATION NUMBER IS 1, WHEN OBSERVE VERSION 2 AT THE SERVER, IT FETCHES ALL PARAMETERS (1): FETCH ALL PARAMETERS → $\begin{bmatrix} 6 & \ldots & 10 \\ 8 & \ldots & 4 \end{bmatrix}$ (2): COMPUTATION ↓

$\begin{bmatrix} 7 & \ldots & 9 \\ 12 & \ldots & 4 \end{bmatrix}$ (3): FETCH_AND_ADD (4): WAITING ↓

$\begin{bmatrix} 8 & \ldots & 10 \\ 12 & \ldots & 4 \end{bmatrix}$ (6): MORE COMPUTATION WORKER 2:
ASSUME LOCAL VERSION GENERATION NUMBER IS 1, WHEN OBSERVE VERSION 2 AT THE SERVER, IT FETCHES ALL PARAMETERS GENERATION 2  $\begin{bmatrix} 6 & \ldots & 10 \\ 8 & \ldots & 4 \end{bmatrix}$ (2): COMPUTATION ↓

GENERATION 3  $\begin{bmatrix} 9 & \ldots & 11 \\ 12 & \ldots & 4 \end{bmatrix}$ (4): WAITING ↓

$\begin{bmatrix} 8 & \ldots & 10 \\ 12 & \ldots & 4 \end{bmatrix}$ (6): MORE COMPUTATION (5): FETCH NEW PARAMETERS

(56) References Cited

U.S. PATENT DOCUMENTS

| | | | |
|---|---|---|---|
| 2010/0083247 A1 | 4/2010 | Kanevsky et al. | |
| 2010/0261481 A1* | 10/2010 | Resende | H04W 36/385 455/446 |
| 2012/0035859 A1* | 2/2012 | Thomas | G01N 15/1429 702/19 |
| 2012/0254836 A1* | 10/2012 | Storer | G06F 8/20 717/121 |
| 2013/0036451 A1* | 2/2013 | Fausak | H04L 67/42 726/3 |
| 2013/0054726 A1* | 2/2013 | Bugge | G06F 9/52 709/212 |
| 2013/0217435 A1* | 8/2013 | Tarraf | H04W 24/02 455/552.1 |
| 2014/0089346 A1* | 3/2014 | Li | G06F 17/30215 707/781 |
| 2014/0106802 A1* | 4/2014 | Cheng | H04W 72/12 455/509 |
| 2015/0134326 A1* | 5/2015 | Bell | G06F 17/276 704/9 |
| 2015/0201366 A1* | 7/2015 | Lim | H04W 40/22 370/328 |
| 2016/0124877 A1* | 5/2016 | Hefty | G06F 13/28 710/308 |
| 2016/0170883 A1* | 6/2016 | Sasanka | G06F 12/0811 711/122 |
| 2016/0189354 A1* | 6/2016 | Kikuchi | G06T 5/40 382/167 |

OTHER PUBLICATIONS

S. Narravula et al., "High Performance Distributed Lock Management Services Using Network-Based Remote Atomic Operations," Seventh IEEE International Symposium on Cluster Computing and the Grid (CCGRID), May 2007, pp. 583-590, Rio De Janeiro, Brazil.

J. Dean et al., "Large Scale Distributed Deep Networks," Neural Information Processing Systems (NIPS), Dec. 2012, 11 pages.

T. Chilimbi et al., "Project Adam: Building an Efficient and Scalable Deep Learning Training System," 11th USENIX Symposium on Operating Systems Design and Implementation (OSDI), Oct. 2014, pp. 571-582.

M. Li et al., "Scaling Distributed Machine Learning with the Parameter Server," 11th USENIX Symposium on Operating Systems Design and Implementation (OSDI), Oct. 2014, pp. 583-598.

\* cited by examiner

FIG. 5

CODE SNIPPET 502

```
wr.opcode = IBV_WR_ATOMIC_FETCH_AND_ADD;
wr.atomic.remote_addr = ... (addr of remote 8 bytes buffer)
wr.atomic.rkey = ...
wr.atomic.compare_add = (a specified amount)

sg.addr = ... (local buffer)

wr.sg_list <- sg (insert sg into wr)

if ibv_post send(wr) success and completion event success
    // wr.atomic.remote_addr will be incremented by wr.atomic.compare_add
    // sg.addr will be update by the value prior to being incremented
```

FIG. 6

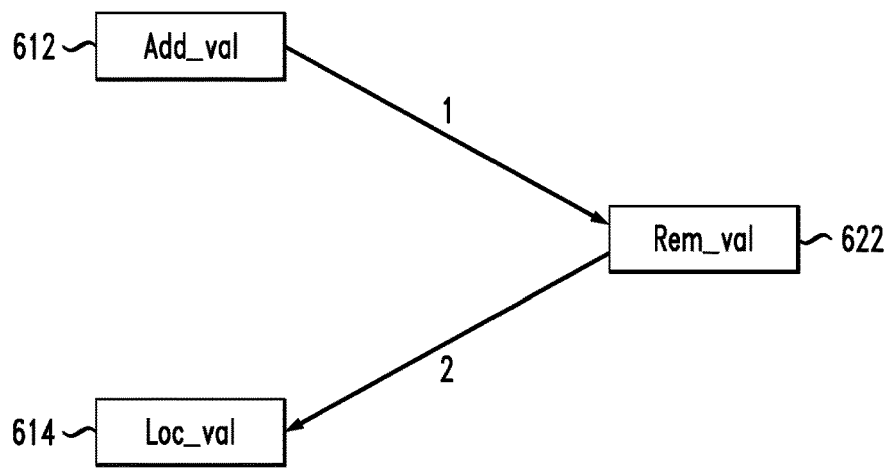

Old_val = Rem_val
Rem_val += Add_val
Loc_val = Old_val

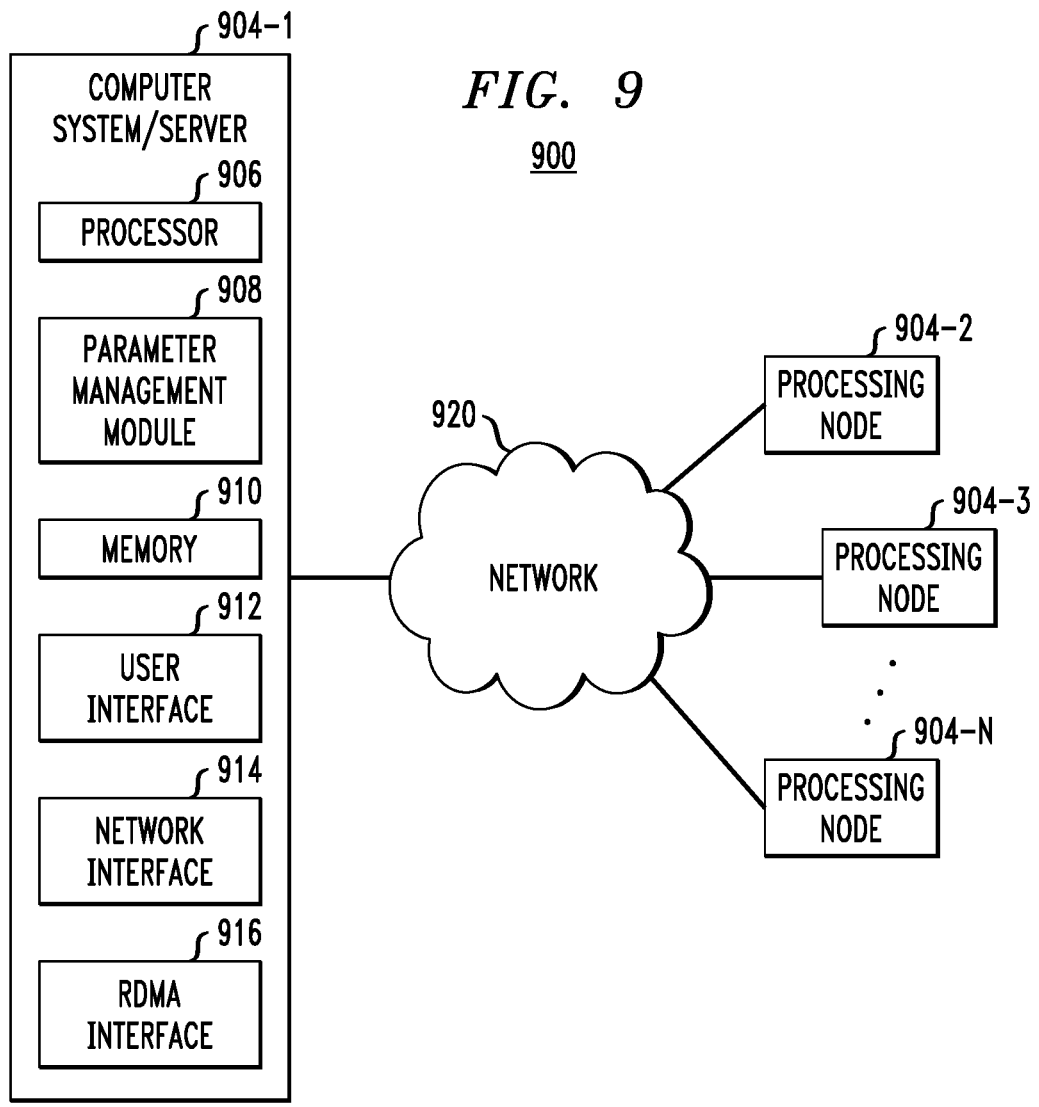

US 10,685,290 B2

PARAMETER MANAGEMENT THROUGH RDMA ATOMIC OPERATIONS

BACKGROUND

Machine learning (ML) systems are used in a wide variety of applications, for example, spam detection, recommendation systems, search engines and computer vision. ML algorithms aim at creating models to train and/or fit large amounts of data and then use the trained models to generate accurate predictions. Training such models can involve training a large number of parameters which may require a significant amount of computational resources.

SUMMARY

Embodiments of the invention provide techniques for parameter management in ML algorithms.

For example, in one embodiment, a method comprises computing one or more parameter changes for one or more parameters at one or more worker nodes, and updating the one or more parameters on a remote server based on the computed one or more parameter changes. The updating is performed via one or more remote direct memory access atomic operations with the remote server.

According to another embodiment of the present invention, an apparatus comprises a processing device comprising a processor operatively coupled to a memory, the processing device being configured to implement the above mentioned method.

According to yet another embodiment, a computer program product comprises a computer readable storage medium for storing computer readable program code which, when executed, causes a computer to perform the above mentioned method.

BRIEF DESCRIPTION OF THE DRAWINGS

FIG. 5 shows an illustrative example of a code snippet for RDMA Fetch-and-add, according to an embodiment of the invention.

FIG. 6 shows illustrative interaction between a client and a server for updating parameters using RDMA atomic operations, according to an embodiment of the invention.

FIG. 9 illustrates an exemplary embodiment of a system for implementing the methodology of FIG. 1.

DETAILED DESCRIPTION

Embodiments of the invention relate to machine learning, and more specifically, to parameter management in machine learning algorithms.

Illustrative embodiments of the invention may be described herein in the context of illustrative methods, systems and devices for parameter management in ML algorithms. However, it is to be understood that embodiments of the invention are not limited to the illustrative methods, systems and devices but instead are more broadly applicable to other suitable methods, systems and devices.

ML algorithms aim at creating models to generate accurate predictions. The process of training an ML model involves providing an ML algorithm with training data to learn from. Typically, ML algorithms accept parameters that can be used to control certain properties of the training process and of the resulting ML model. The ML models are mathematical equations and logic with parameters. The model training and/or fitting is the process of identifying the values of the parameters such that the model fits the given training data.

Model training in large scale ML can involve large amounts of parameters. However, model training with a large number of parameters may be difficult due to the large amount of data from speech, image processing and other sources, which may require complex models to describe the underlying relationship in the data. Furthermore, complex models with a large number of parameters may require large amounts of computation power and high speed networks for model training.

Embodiments of the invention provide for methods and systems for dealing with ML algorithms with a large number of parameters (e.g., Stochastic Gradient Descent algorithm for deep neural networks) using relatively simple update operations. Furthermore, various embodiments herein provide an efficient mechanism to speed up the model training process for models with a large number of parameters.

Advantageously, embodiments of the invention use Remote Direct Memory Access (RDMA) atomic fetch_and_add technology to speed up the parameter update process between worker nodes and one or more servers for iterative model training.

Embodiments of the invention relate to parameter management through RDMA atomic operations. More particularly, various embodiments relate to a method for updating parameters on a remote server through one-sided fetch_and_add atomic operations.

Figure 1:
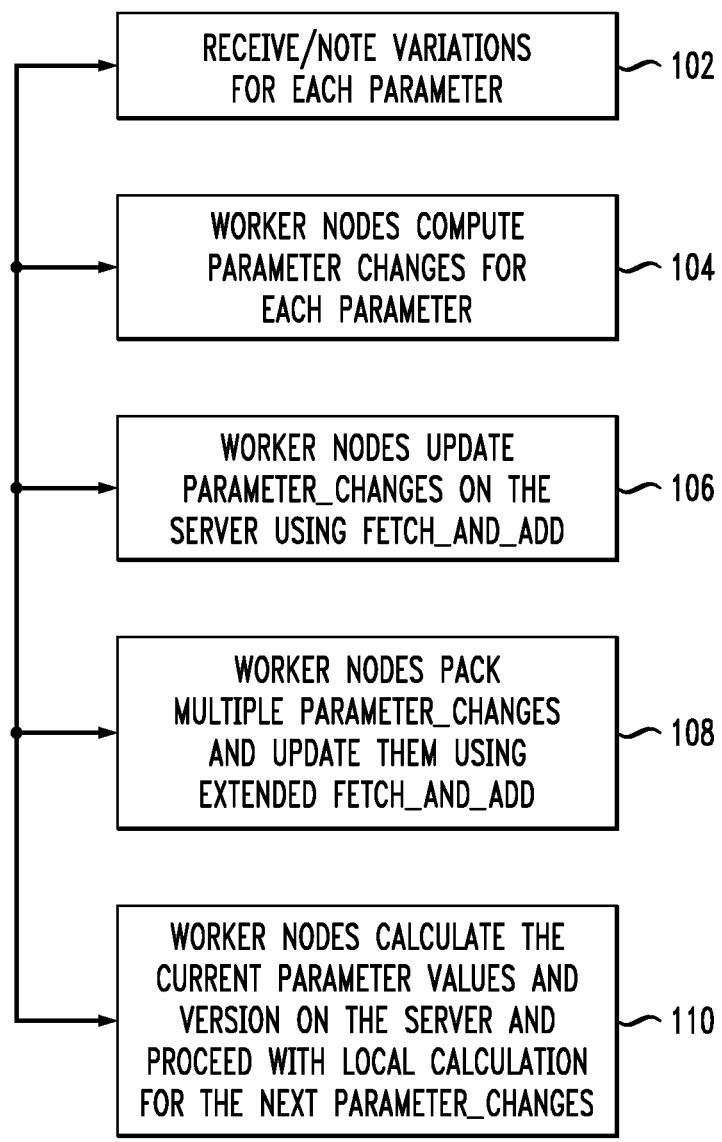
FIG. 1 illustrates an overview process of a methodology for performing parameter management using remote direct memory access (RDMA) atomic operations, according to an embodiment of the invention.

Referring to the figures, FIG. 1 depicts an overview of a methodology 100 for performing parameter management using RDMA atomic operations, according to an embodiment. At step 102, one or more variations for one or more parameters are received or noted. Then at step 104, one or more worker nodes compute one or more parameter changes for each parameter. Then at step 106, the one or more worker nodes update the one or more parameter_changes on one or more servers using fetch_and_add. At step 108, the one or more worker nodes can also pack multiple parameter_changes and update them using extended fetch_and_add. At step 110, the one or more worker nodes calculate one or more current parameter values and version on the server and proceed with local calculation for the next parameter_changes.

Notably, the frequency of parameter change is usually a controllable configuration parameter. For example, certain systems are configured to exchange the parameter values after processing a certain number of input samples (e.g., 50, 100, 200, or more). As such, the setting for the frequency of updates may vary depending on the application.

As used herein, a parameter may refer to a property or characteristic of interest. For example, in a machine translation application from English to French, the training data is a large set of English to French translated sentence pairs. The model can be a multi-layered neural network. At a high level, the parameters may represent the frequency of appearance of the words in the vocabulary, the correlation between different words, etc. There can be billions of parameters in a large scale model. The scale of the problem makes it hard. The training process involves picking one sentence pair at a time, apply a set of mathematical calculations to update the values of all the parameters. When there are multiple learners (e.g., clients, workers), each learner picks a sentence pair from its own data set, performs its own updates locally. After processing a certain number of sentence pairs, each learner needs to exchange its parameter values with the parameter server so as to achieve coordinated learning across all the learners.

Figure 2:
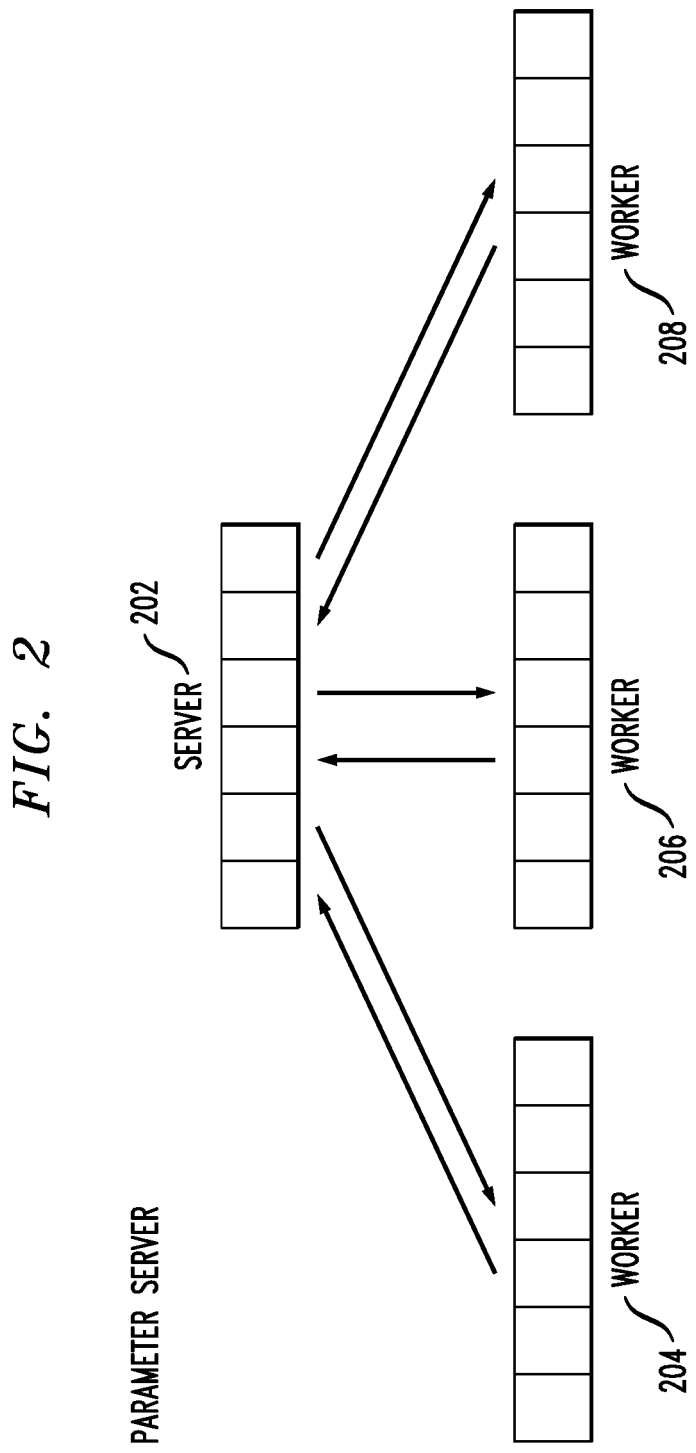
FIG. 2 illustrates an example of a typical parameter update process for a parameter server, according to an embodiment of the invention.

FIG. 2 shows an illustrative example of a typical parameter update process for a parameter server. A parameter server is a centralized repository for all the parameters. Each parameter server may include millions or more parameters for multiple machine learning algorithms. For each parameter server, hundreds or more worker nodes need to update parameter values. As such, higher update frequency may lead to increases in required computational power.

The basic update scheme of Gradient Descent algorithms is, given n data points, find the best fit parameter vector w to minimize function: sum_{i=1 to n} f(i,w). Then, update equation:

$$w(t+1)=w(t)-a(t)*(\text{sum}\_\{i=1 \text{ to } n\} \text{ gradient}(i,w(t)))/n$$

where a(t) is pre-determined.
Generic update equation:

$$w(t+1)=w(t)+\text{parameter\_change}.$$

As shown in FIG. 2, workers 204, 206, and 208 upload one or more parameter_changes to server 202. Server 202 may then apply the one or more parameter_changes. Workers 204, 206, 208 may download updated parameters and compute parameter_changes for the next iteration.

For synchronous updates, workers 204, 206 and 208 wait for updated parameter values. However, this may take a long time. Various embodiments herein use Message Passing Interface (MPI) distributed aggregation tree to reduce the wait time. For asynchronous updates, there is a shorter wait, but may need rigorous proof of convergence. Various embodiments herein can limit the use of parameters with versions that are too old. Embodiments herein also solve the main problems of heavy load on server and network congestion associated with typical update processes for a parameter server.

ML algorithms generally update the parameters according to a human configuration threshold known as an epoch. Within each epoch, each worker processes a fixed number of input, e.g. images or speech sentences, then uses fetch_and_add to update the parameters.

Parameters are commonly organized as matrices. Illustratively, assume that at a certain point, one or more learners use the following matrix (1) stored in the parameter server to start training process:

$$\begin{bmatrix} 6 & \dots & 10 \\ 8 & \dots & 4 \end{bmatrix} \quad (1)$$

Then after an epoch worker 1 and worker 2 obtain new parameters such as the following:

$$\text{Worker 1} \begin{bmatrix} 7 & \dots & 9 \\ 12 & \dots & 4 \end{bmatrix} \quad \text{Worker 2} \begin{bmatrix} 9 & \dots & 11 \\ 12 & \dots & 4 \end{bmatrix}$$

Then worker 1 and worker 2 will update the parameters within the matrix (1) with the following numbers by using fetch_and_add, respectively. The numbers are generated by calculation local variations.

$$\text{Worker 1} \begin{bmatrix} 0.5 & \dots & -0.5 \\ 2 & \dots & 0 \end{bmatrix} \quad \text{Worker 2} \begin{bmatrix} 1.5 & \dots & 0.5 \\ 2 & \dots & 0 \end{bmatrix}$$

Then the matrix stored in the server becomes matrix (2) below:

$$\begin{bmatrix} 8 & \dots & 10 \\ 12 & \dots & 4 \end{bmatrix} \quad (2)$$

Figure 3:
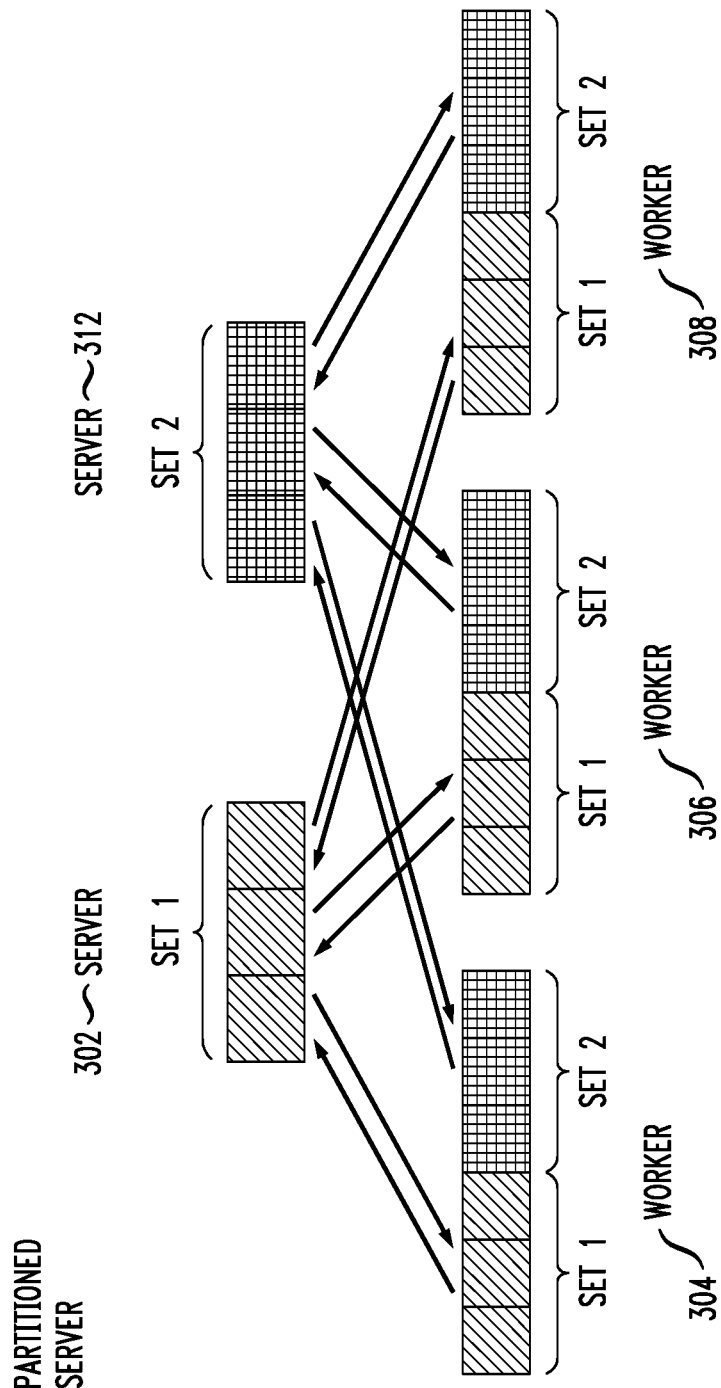
FIG. 3 shows an illustrative example of partitioned servers, according to an embodiment of the invention.

FIG. 3 shows an illustrative example of partitioned servers. Parameters are partitioned into disjoint sets, each server serves one set of parameters. As shown in FIG. 3, the parameters in each of workers 304, 306 and 308 are partitioned into set 1 and set 2. Server 302 serves set 1 and server 312 serves set 2. Using partitioned servers reduces the amount of processing on each server. As the total amount of traffic remains the same, coordination across servers is needed in order to maintain versions. Partitioned servers can be useful when server central processing unit (CPU) is the bottleneck.

Figure 4:
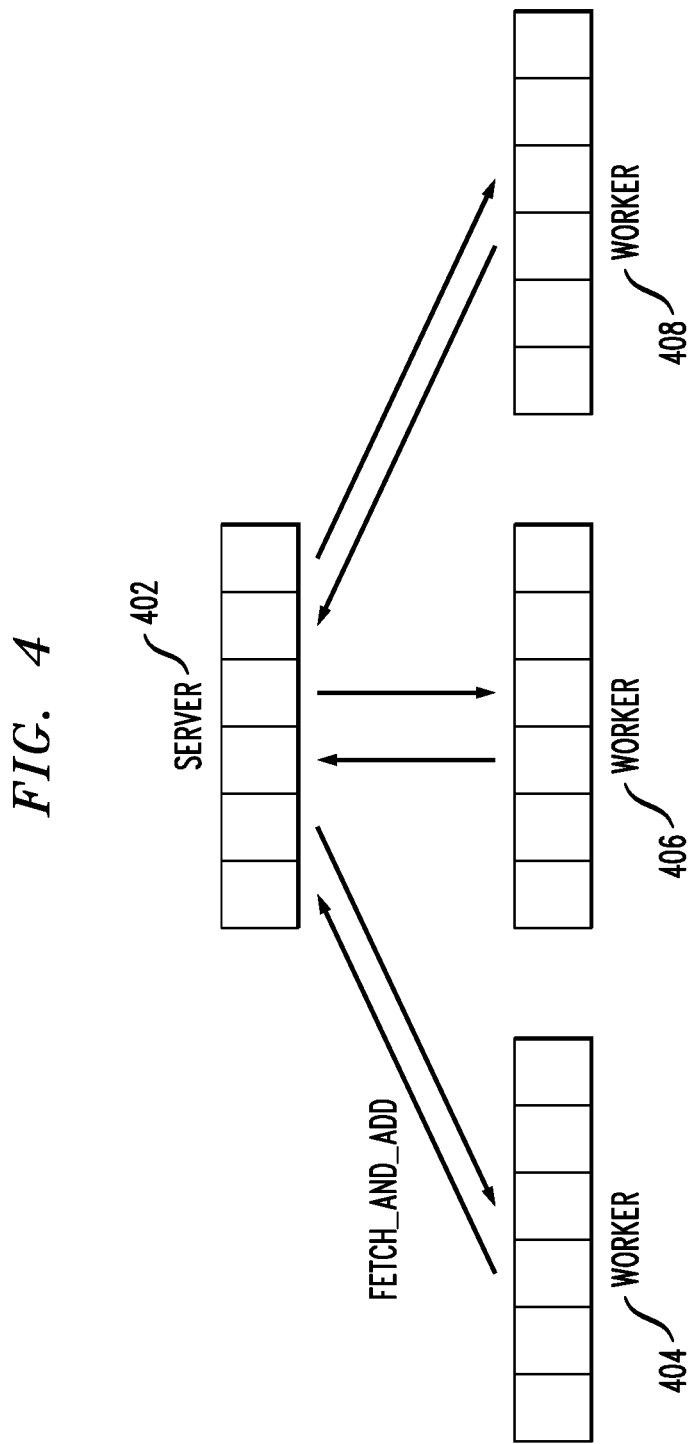
FIG. 4 illustrates an embodiment of the invention using RDMA atomic fetch_and_add to update parameters.

FIG. 4 illustrates an embodiment of the invention using RDMA atomic fetch_and_add to update parameters. In various embodiments, it may be desirable for information to be transferred from a system memory associated with one computer system to a system memory associated with another computer system. The information may be transferred more efficiently by using RDMA and performing atomic operations to conserve system resources and ensure that data integrity is maintained. As such, using RDMA atomic operations according to various embodiments herein mean that the server CPU is not involved, thereby reducing CPU utilization and network traffic.

Each of the server 402 and workers 404, 406 and 408 may utilize a RDMA-enabled Network Interface Card ("RNIC") to communicate with the other systems and perform RDMA atomic operations. Atomic operations may comprise a group of operations that may happen simultaneously or in sequence but without interruption for a specific task to be accomplished properly. Atomic operation may include the examination of data, modification of data, placement of a new value into a data location, and/or returning a response on the result of the operation with previous or subsequent values of the data or the like.

Each of workers 404, 406 and 408 can obtain a version and current value of one or more parameters on the server 402 at once. Each of the workers 404, 406 and 408 may use high order bit for versioning. Extended version of fetch_and_add can update multiple parameters at once. This solution can be used in conjunction with MPI distributed aggregation tree and partitioned servers.

FIG. 5 shows an illustrative example of a code snippet for RDMA Fetch-and-add. Code snippet 502 shows that Rem_val should be registered with IBM_ACCESS_REMOTE_ATOMIC flag and Loc_val is registered on the client.

FIG. 6 shows illustrative interaction between a client 610 and server 620 for updating parameters using RDMA atomic operations. Client 610 may perform atomic operations, such as Add_val 612 with server 620. The RNIC on server 620 may update the parameter located at Rem_val 622 and send its value before being updated back to memory location Loc_val 614 at client 610.

Synchronization management of parameter updates can be performed as follows. The initial version is defined to be 0, the next version of all the parameters is defined to be a state after the worker nodes have updated the parameters exactly once. In order to keep track of the actions of all the worker nodes, a generation_number is kept on the server for each worker node to indicate how many times the worker node has performed updates. Each worker node increases its generation_number by 1 after it has applied its updates to all the parameters. The server's version number is the smallest generation_number of all the worker nodes.

Synchronized updates may be performed as follows:
Each worker node:
1) Wait for server's version number=its own generation number.
2) Fetch all parameter values from server and calculate the parameter_changes.
3) Use atomic fetch_and_add to update parameters on the server.
4) Update its generation_number on the server.

Server node:
1) Periodically check generation_number for all the worker nodes and update its version number.
2) Determine if a worker node has not responded for a long time and replace it with a new node.
3) Determine if convergence has been reached.

Figure 7:
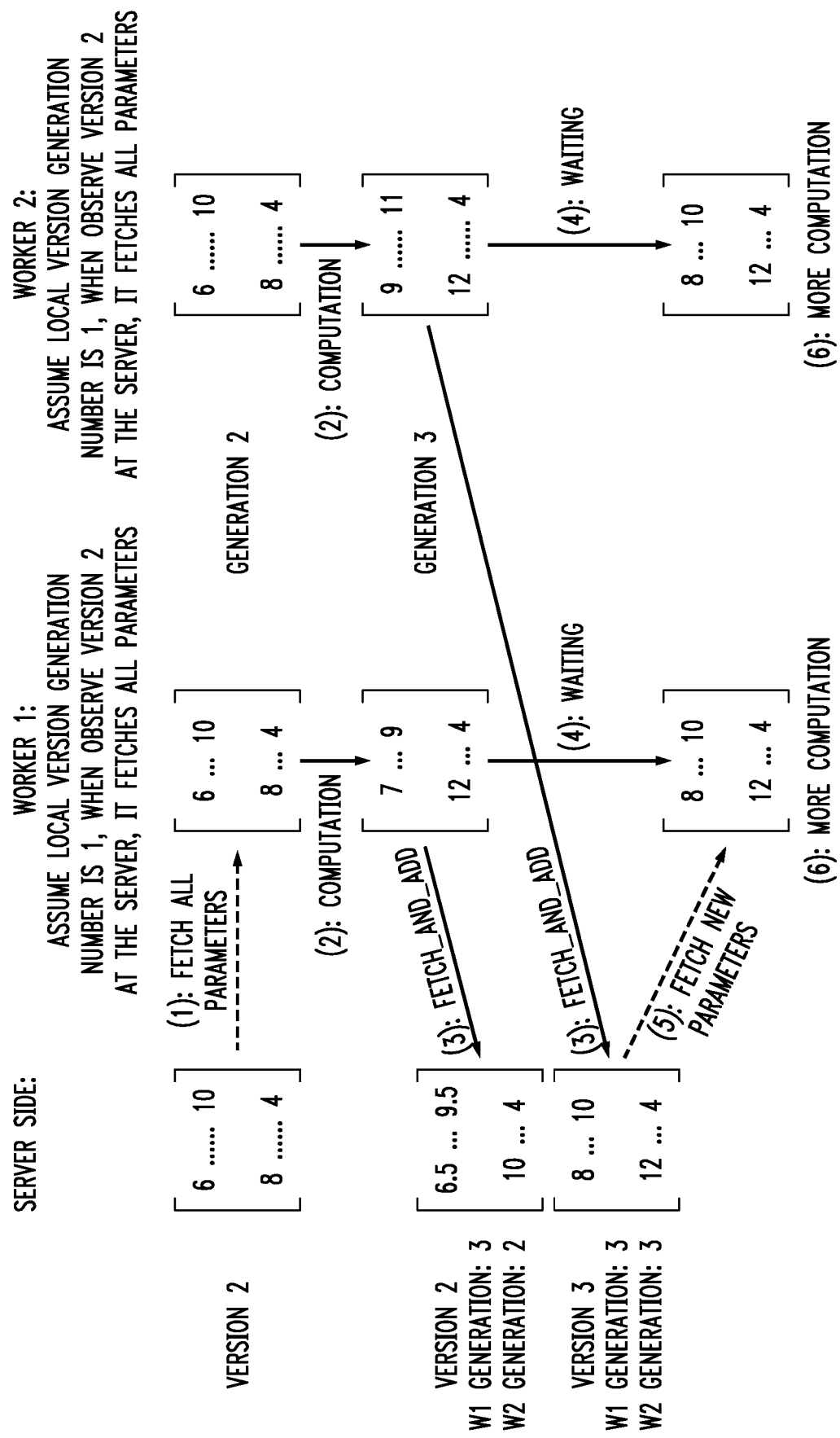
FIG. 7 shows an illustrative example of synchronous updates performed according to an embodiment of the invention.

FIG. 7 shows an illustrative example of synchronous updates performed according to an embodiment of the invention. On the worker nodes, at worker 1 and worker 2, assuming that local version generation number is version 1, when worker 1 and worker 2 observe version 2 at the server, each of worker 1 and worker 2 fetches all parameters. Then worker 1 and worker 2 computes the parameter_changes to arrive at generation 3. Worker 1 and worker 2 then use atomic fetch_and_add to update one or more parameters at the server and updates the generation_number on the server. Worker 1 and worker 2 may then wait for the server to collect parameters from all learners (e.g., worker nodes) and again fetch the latest version for updating. The process may repeat each time a new version is observed or detected. On the server side, the server periodically checks generation_number for all worker nodes (here, worker 1 and worker 2) and updates its version number.

Asynchronized updates may be performed as follows:
Each worker node:
1) Use atomic fetch_and_add to update parameters on the server.
2) Compute current server side parameter values from values obtained from fetch_and_add.
3) Obtain version number for parameters on server.
4) Update its generation_number on the server.
5) If worker_generation_number−server_version_number<threshold then calculate new parameter_changes.

Notice that as parameters on the server are concurrently updated by multiple worker nodes through atomic fetch_and_add, it is possible for some parameters to have been updated by other worker nodes while other parameters have not updated.
6) Else, wait for server_version_number>=worker_generation_number−threshold.

Fetch all parameter values and calculate new parameter_changes.

Server node (similar to synchronized updates):
1) Periodically check generation_number for all the worker nodes and update its version number.
2) Determine if a worker node has not responded for a long time and replace it with a new node.
3) Determine if convergence has been reached.

Threshold=0 corresponds to synchronized updates.

Referring to the example shown in FIG. 7, for asynchronous updates/execution, worker 1 may not need to wait for a long time. Instead, it can fetch the latest version of the parameters from the server without waiting for the server to collect all the parameters from all the learners.

Figure 8A:
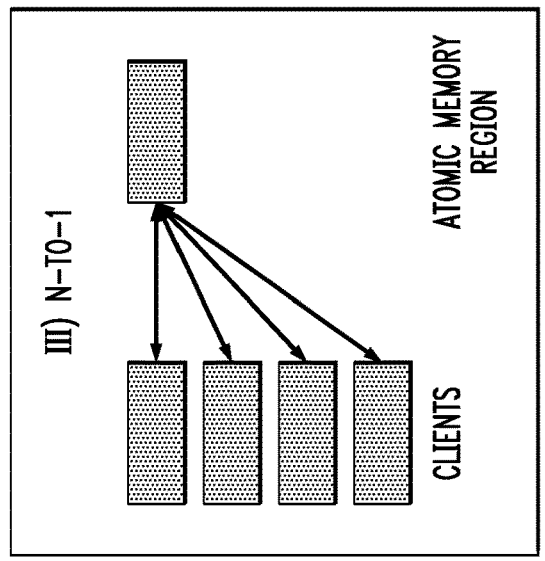
FIGS. 8A-8C show illustrative test scenarios for systems implementing various embodiments of the invention.
Figure 8B:
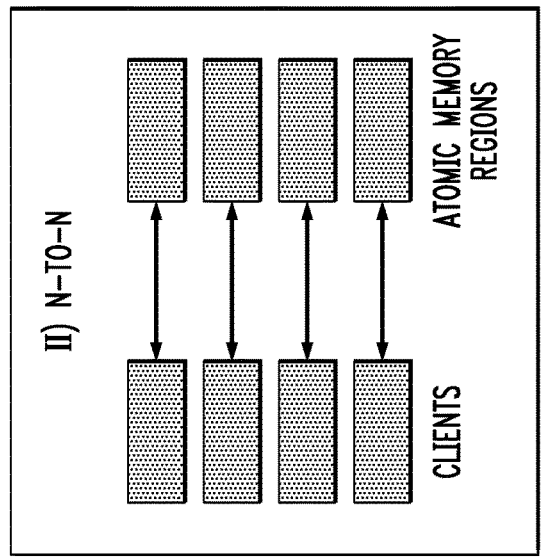
Figure 8C:
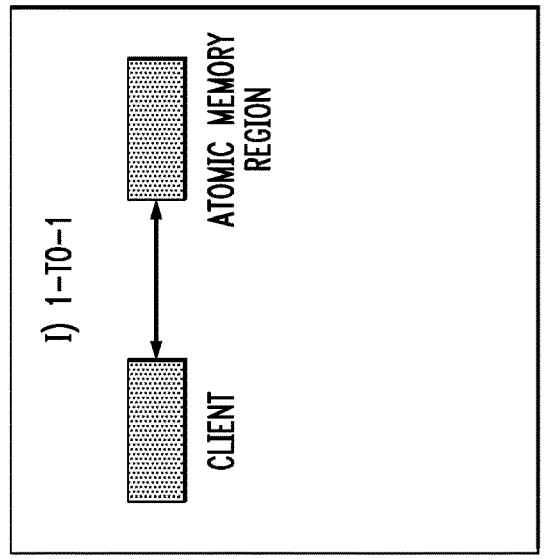

FIGS. 8A-8C show illustrative test scenarios for systems implementing various embodiments of the invention. FIG. 8A shows a first scenario in which one client operates on one atomic memory region. FIG. 8B shows a second scenario in which multiple clients operate on multiple atomic memory regions. FIG. 8C shows a third scenario in which multiple clients operate on one atomic memory region. A client may include a value to be added, while a memory region may be used for retrieving the previous value and performing one or more threads.

Various embodiments of the invention provide benefits of using RDMA atomic updates. For example, RDMA atomic updates can be performed concurrently by multiple clients with high performance. As such, this scheme can achieve the correct result without using locking mechanisms to deal with concurrent updates.

FIG. 9 depicts a system 900 for implementing the embodiments described above (e.g., a methodology 100 of FIG. 1). System 900 includes processing nodes 904-1 . . . 904-N, configured to communicate over a network 920. Each of processing nodes 904-1 . . . 904-N may be configured as shown in computer system/server 904-1, which may include, but is not limited to, personal computer systems, server computer systems, thin clients, thick clients, hand-held or laptop devices, multiprocessor systems, microprocessor-based systems, programmable consumer electronics, network PCs, minicomputer systems, mainframe computer systems, and distributed cloud computing environments that include any of the above systems or devices, and the like. Computer system/server 904-1 may include one or more processors 906 coupled to a memory 910, a user interface 912, a network interface 914 and an RDMA interface 916. Computer system/server 904-1 may also comprise a parameter management module 908 for implementing one or more steps of methodology 100 of FIG. 1.

The parameter management module 908 may interact with the RDMA interface 916 to perform one or more parameter management functions described above. The RDMA interface 916 may be an RNIC described above. Hardware, software or some combination thereof may be employed to implement the RDMA interface 916. The parameter management module 908 in conjunction with the RDMA interface 916 may perform one or more atomic operations, such as one or more parameter updates described above, with one or more other processing nodes and/or servers 904-2 . . . 904-N.

User interface 912 may be configured to enable user input into the computer system/server 904-1. Network interface 914 may be configured to enable the computer system/server 904-1 to interface with a network and other system components. Network 920 may be a communication link comprising an internet connection, Ethernet link, local area link, cellular link, satellite link, global system for mobile communication (GSM), etc. It is to be appreciated that system 900 may include more or less components than shown in FIG. 9. For example, system 900 may include additional components suitable for implementing methodology 100 of FIG. 1.

Embodiments of the invention may be a system, a method, and/or a computer program product at any possible technical detail level of integration. The computer program product may include a computer readable storage medium (or media) having computer readable program instructions thereon for causing a processor to carry out aspects of the invention. For example, computer system/server 904-1 may comprise a computer program product for implementing embodiments of the invention disclosed herein.

The computer readable storage medium (e.g., memory 910) can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network (e.g., network 920), including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing below, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
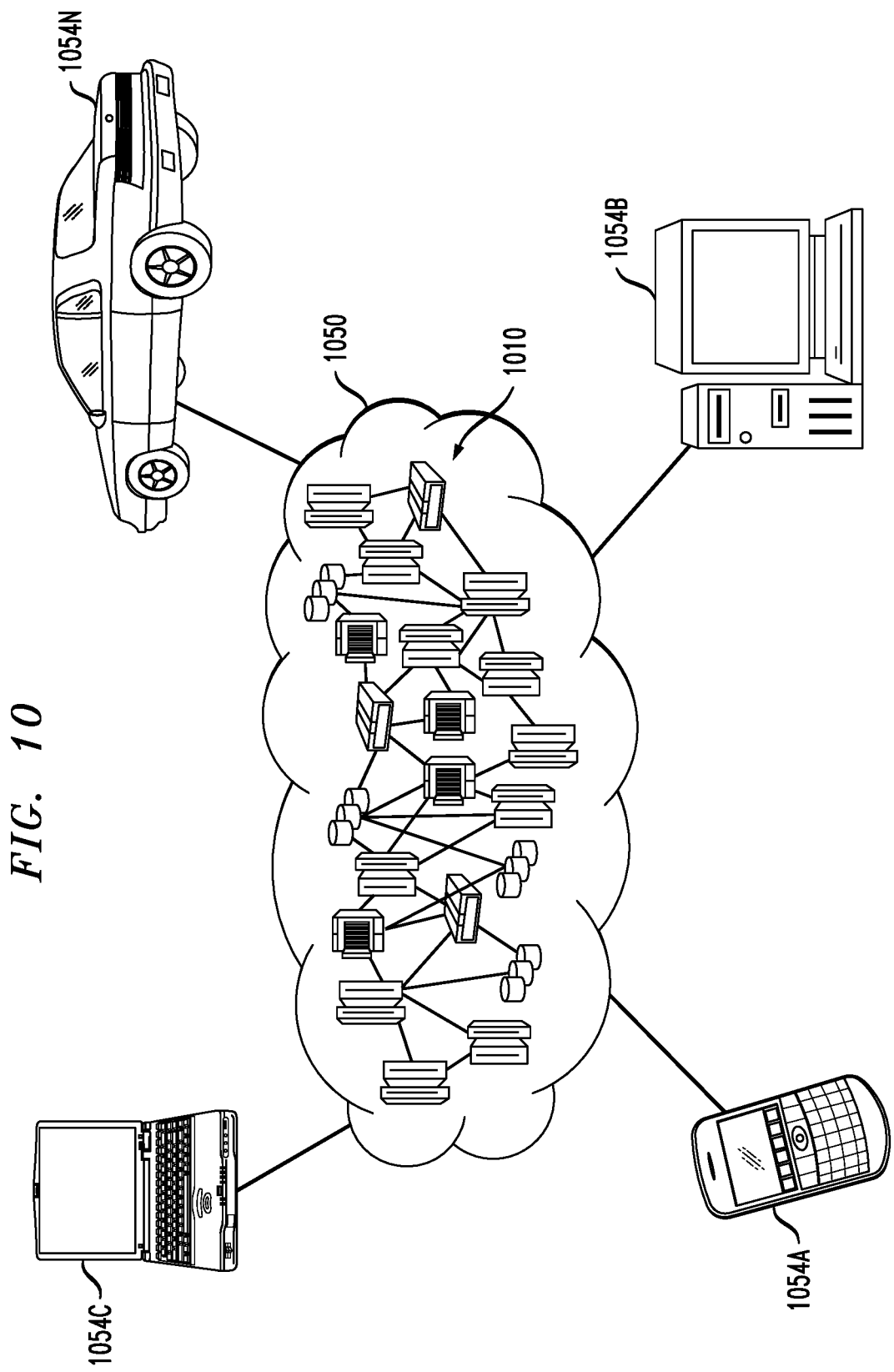
FIG. 10 illustrates a cloud computing environment, according to an embodiment of the invention.

Referring now to FIG. 10, illustrative cloud computing environment 1050 is depicted. As shown, cloud computing environment 1050 comprises one or more cloud computing nodes 1010 with which local computing devices used by cloud consumers, such as, for example, a wearable device (not explicitly shown), a personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
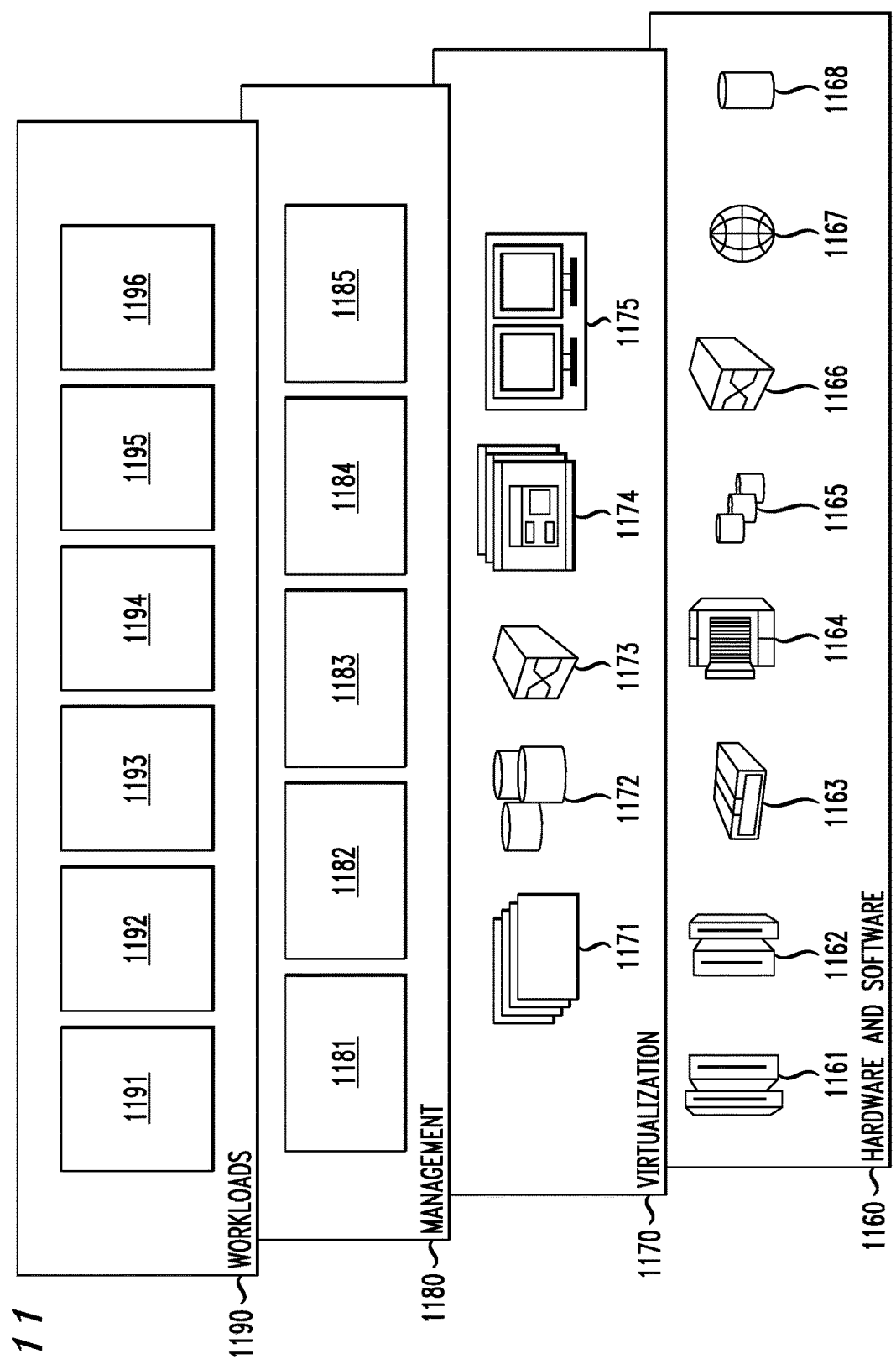
FIG. 11 depicts abstraction model layers according to an embodiment of the invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and parameter management 1196, which may implement one or more functions described above.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   in a computing system comprising a plurality of worker nodes operatively coupled to one or more parameter servers via a communication network, wherein the one or more parameter servers receives uploaded parameter changes for a plurality of machine language algorithms from the plurality of worker nodes;
   in response to receiving one or more updated parameters from the one or more parameter servers computing, at one or more of the plurality of worker nodes, a plurality of parameter changes for one or more parameters;
   updating one or more parameters on the one or more parameter servers based on the plurality of parameter changes computed by the one or more worker nodes, wherein updating the one or more parameters comprises:
      storing a generation number on at least one of the one or more parameter servers for each worker node to indicate the number of updates the worker node has performed, and
      incrementing the generation number, for a given one of the worker nodes, after the given one of the worker nodes has applied another update to one or more parameters,
      wherein a version number of at least one of the one or more parameter servers is the smallest generation number among the worker nodes; and
   repeating the computing and updating to achieve a desired criterion;
   wherein the updating is performed via one or more remote direct memory access atomic operations with the one or more parameter servers; and
   wherein the computing and updating are performed by processor devices that comprise the computing system.

2. The method of claim 1, wherein updating the one or more parameters comprises using fetch_and_add operations.

3. The method of claim 1, further comprising updating the one or more parameters using extended fetch_and_add operations.

4. The method of claim 3, wherein the extended fetch_and_add operations simultaneously update a plurality of parameters.

5. The method of claim 4, wherein the extended fetch_and_add operations use a Message Passing Interface (MPI) distributed aggregation tree and a plurality of partitioned parameter servers.

6. The method of claim 4, wherein the extended fetch_and_add operations use a Message Passing Interface (MPI) distributed aggregation tree and a plurality of partitioned parameter servers.

7. The method of claim 1, wherein updating the one or more parameters is selectable between one of a synchronous mode and an asynchronous mode.

8. The method of claim 1, wherein the one or more parameters comprise matrices.

9. The method of claim 1, wherein the desired criterion comprises increasing the computation power of the computing system.

10. An apparatus comprising:
    in a computing system comprising a plurality of worker nodes operatively coupled to one or more parameter servers via a communication network, wherein the one or more parameter servers receives uploaded parameter changes for a plurality of machine language algorithms from the plurality of worker nodes and wherein the computing system comprises processor devices;
    at least one processing device comprising a processor operatively coupled to a memory, the processing device being configured to:
       in response to receiving one or more updated parameters compute from the one or more parameter servers computing, at one or more of the plurality of worker nodes, a plurality of parameter changes for one or more parameters;
       update one or more parameters on the one or more parameter servers based on the plurality of parameter changes computed by the one or more worker nodes, wherein updating the one or more parameters comprises:

storing a generation number on at least one of the one or more parameter servers for each worker node to indicate the number of updates the worker node has performed, and incrementing the generation number, for a given one of the worker nodes, after the given one of the worker nodes has applied another update to one or more parameters, wherein a version number of at least one of the one or more parameter servers is the smallest generation number among the worker nodes; and repeat the computing and updating to achieve a desired criterion;

wherein the updating is performed via one or more remote direct memory access atomic operations with the one or more parameter servers.

11. The apparatus of claim 10, wherein updating the one or more parameters using fetch_and_add operations.

12. The apparatus of claim 10, wherein updating the one or more parameters is selectable between one of a synchronous mode and an asynchronous mode.

13. The apparatus of claim 10, wherein the one or more parameters comprise matrices.

14. The apparatus of claim 10, wherein updating the one or more parameters comprises using extended fetch_and_add operations.

15. The apparatus of claim 14, wherein the extended fetch_and_add operations simultaneously update a plurality of parameters.

16. A computer program product comprising a non-transitory computer readable storage medium for storing computer readable program code which, when executed, causes a computer to:

in response to receiving one or more updated parameters from one or more parameter servers operatively coupled to a plurality of worker nodes via a communication network compute, at one or more of a plurality of worker nodes, a plurality of parameter changes for one or more parameters, wherein the one or more parameter servers maintains parameters for a plurality of machine language algorithms associated with the plurality of worker nodes; and update one or more parameters on the one or more parameter servers based on the plurality of parameter changes computed by the one or more worker nodes, wherein updating the one or more parameters comprises:

storing a generation number on at least one of the one or more parameter servers for each worker node to indicate the number of updates the worker node has performed, and incrementing the generation number, for a given one of the worker nodes, after the given one of the worker nodes has applied another update to one or more parameters, wherein a version number of at least one of the one or more parameter servers is the smallest generation number among the worker nodes;

wherein the updating is performed via one or more remote direct memory access atomic operations with the one or more parameter servers; and repeat the computing and updating to achieve a desired criterion.

17. The computer program product of claim 16, wherein updating the one or more parameters comprises using fetch_and_add operations.

18. The computer program product of claim 16, further comprising updating the one or more parameters using extended fetch_and_add operations.

19. The computer program product of claim 18, wherein the extended fetch_and_add operations simultaneously update a plurality of parameters.

20. The computer program product of claim 16, wherein updating the one or more parameters is selectable between one of a synchronous mode and an asynchronous mode.

* * * * *